(12) United States Patent
Hamana et al.

(10) Patent No.: US 11,906,913 B2
(45) Date of Patent: Feb. 20, 2024

(54) ELECTROPHOTOGRAPHIC BELT AND ELECTROPHOTOGRAPHIC IMAGE-FORMING APPARATUS

(71) Applicant: CANON KABUSHIKI KAISHA, Tokyo (JP)

(72) Inventors: Eiichi Hamana, Tokyo (JP); Kouichi Uchida, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/718,109

(22) Filed: Apr. 11, 2022

(65) Prior Publication Data

US 2022/0244664 A1    Aug. 4, 2022

Related U.S. Application Data

(63) Continuation of application No. PCT/JP2020/037726, filed on Oct. 5, 2020.

(30) Foreign Application Priority Data

Oct. 18, 2019   (JP) .................................. 2019-191116

(51) Int. Cl.
*G03G 15/16*   (2006.01)
*G03G 5/10*    (2006.01)
*G03G 5/147*   (2006.01)

(52) U.S. Cl.
CPC ........... *G03G 15/162* (2013.01); *G03G 5/105* (2013.01); *G03G 5/14752* (2013.01); *G03G 15/1685* (2013.01)

(58) Field of Classification Search
CPC .. G03G 15/162; G03G 15/1685; G03G 5/105; G03G 5/14752
See application file for complete search history.

(56) References Cited

U.S. PATENT DOCUMENTS

| 2014/0377564 | A1  | 12/2014 | Sakamoto |
| 2016/0259273 | A1* | 9/2016  | Izutani ............... G03G 15/162 |
| 2017/0139355 | A1* | 5/2017  | Yoshida .............. G03G 15/162 |
| 2018/0267435 | A1* | 9/2018  | Kubo .................. G03G 15/162 |

FOREIGN PATENT DOCUMENTS

| JP | 2006184787 A | 7/2006 |
| JP | 2006330692 A | 12/2006 |
| JP | 2007178750 A | 7/2007 |
| JP | 2011197268 A | 10/2011 |
| JP | 2013041121 A | 2/2013 |
| JP | 2016148768 A | 8/2016 |
| JP | 2018025621 A | 2/2018 |

OTHER PUBLICATIONS

Ying, Z et al., "Electron beam curable coatings and applications" Nov. 30, 2014.

* cited by examiner

*Primary Examiner* — Joseph S Wong
(74) *Attorney, Agent, or Firm* — Canon U.S.A., Inc., IP Division

(57) ABSTRACT

An electrophotographic belt having a layered structure with excellent scratch resistance and excellent adhesion of layers to each other. The electrophotographic belt includes a first layer and a second layer directly covering any one of the inner peripheral surface and the outer peripheral surface of the first layer, the first layer containing a first polyester resin, and the second layer containing a second polyester resin and an acrylic resin that contains a carboxy group in its molecule.

16 Claims, 5 Drawing Sheets

ELECTROPHOTOGRAPHIC BELT AND ELECTROPHOTOGRAPHIC IMAGE-FORMING APPARATUS

CROSS-REFERENCE TO RELATED APPLICATIONS

This application is a Continuation of International Patent Application No. PCT/JP2020/037726, filed Oct. 5, 2020, which claims the benefit of Japanese Patent Application No. 2019-191116, filed Oct. 18, 2019, both of which are hereby incorporated by reference herein in their entirety.

TECHNICAL FIELD

The present disclosure is directed to providing an electrophotographic belt for use in electrophotographic image-forming apparatuses (hereinafter, referred to as "electrophotographic apparatuses"), such as copiers and printers, and an electrophotographic image-forming apparatus.

BACKGROUND ART

In an electrophotographic image-forming apparatus (hereafter, also referred to as an "electrophotographic apparatus"), an electrostatic latent image-bearing member, such as a photoconductive drum, is charged, and the charged electrostatic latent image-bearing member is exposed to light to form an electrostatic latent image. Subsequently, the electrostatic latent image is developed with a toner subjected to triboelectric charging. The resulting toner image is transferred and fixed onto a recording medium, such as paper, thereby forming a desired image on the recording medium. As a transfer system of such an electrophotographic apparatus, the following intermediate transfer system has been known: an unfixed toner image on an electrostatic latent image-bearing member, such as a photoconductive drum, is primarily transferred onto an intermediate transfer member using a current supplied from a transfer power source, and then the unfixed toner image is secondarily transferred from the intermediate transfer member onto a recording medium.

Patent Literature 1 and Patent Literature 2 each disclose, as an electrophotographic belt that can be used for an intermediate transfer member, an electrophotographic belt having a layered structure including a thermoplastic resin-containing layer (hereinafter, also referred to as a "base layer" or "first layer") and an acrylic resin-containing layer (hereinafter, also referred to as a "hard coat layer") that is provided on the outer or inner peripheral surface of the base layer and that has higher hardness than the base layer.

CITATION LIST

Patent Literature

PTL 1 Japanese Patent Laid-Open No. 2006-330692
PTL 2 Japanese Patent Laid-Open No. 2007-178750

The inventors have conducted studies and found that the electrophotographic belts according to PTL 1 and PTL 2 still have room for improvement in the adhesion of the hard coat layers to the base layers. In particular, with the recent miniaturization of main bodies of electrophotographic apparatuses, electrophotographic belts have come to be disposed in electrophotographic apparatuses in a state where they are bent at a higher curvature. Thus, the inventors have recognized a need to develop a technique to produce an electrophotographic belt that can effectively prevent a hard coat layer from peeling off from a base layer even when the belt is bent at a high curvature.

SUMMARY

At least one aspect of the present disclosure is directed to providing an electrophotographic belt having excellent scratch resistance and excellent adhesion of layers to each other.

At least one other aspect of the present disclosure is directed to providing an electrophotographic image-forming apparatus capable of stably forming a high-quality electrophotographic image.

According to at least one aspect of the present disclosure, there is provided an electrophotographic belt including a first layer and a second layer directly covering any one of the inner peripheral surface and the outer peripheral surface of the first layer, the first layer containing a first polyester resin, and the second layer containing a second polyester resin and an acrylic resin that contains a carboxy group in a molecule.

According to at least one other aspect of the present disclosure, there is provided an electrophotographic image-forming apparatus including a plurality of toner image-bearing members and an intermediate transfer belt to which a toner image is primarily transferred from each of the toner image-bearing members, the intermediate transfer belt being the electrophotographic belt described above.

Further features of the present disclosure will become apparent from the following description of exemplary embodiments with reference to the attached drawings.

DESCRIPTION OF EMBODIMENTS

To improve the adhesion of a hard coat layer to a base layer, the inventors attempted to allow the base layer to contain a polyester resin as a binder resin and also to allow the hard coat layer to contain an acrylic resin-containing polyester resin. This was intended to improve the adhesion of the hard coat layer to the base layer by allowing both the base layer and the hard coat layer to contain polyester resin to increase the affinity of the base layer and the hard coat layer for each other. As a result, the adhesion of the hard coat layer to the base layer was able to be improved. Meanwhile, the addition of the polyester resin to the hard coat layer deteriorated the scratch resistance of the hard coat layer.

The inventors have further conducted studies in order to reduce the deterioration in scratch resistance due to the addition of the polyester resin to the hard coat layer and have found that the introduction of a carboxy group into molecules of the acrylic resin in the hard coat layer suppresses the deterioration in scratch resistance due to the addition of the polyester resin to the hard coat layer.

Specifically, in a electrophotographic belt including a base layer (hereinafter, also referred to as a "first layer") containing a first polyester resin as a binder resin and a hard coat layer (hereinafter, also referred to as a "second layer") that directly covers any one of the front surface and the back surface of the first layer and that contains an acrylic resin, the incorporation of a second polyester resin and the acrylic resin containing a carboxy group in its molecules in the hard coat layer enables an improvement in the adhesion of the second layer to the first layer while a deterioration of the scratch resistance of the second layer is suppressed.

Here, the reason why the scratch resistance of the second layer is less likely to deteriorate when a carboxy group is present in the molecule of the acrylic resin in the second layer even in the presence of the second polyester resin in the second layer is presumably that interactions, such as hydrogen bonding, occur between the terminal hydroxy group of the second polyester resin and the carboxy group of the acrylic resin, and a pseudo-crosslinked structure is formed between the acrylic resin and the second polyester resin.

The content ratio of the carboxy group of the acrylic resin to the hydroxy group of the second polyester resin in the second layer (carboxy group/hydroxy group) is preferably 1.0 or more and 12.0 or less, particularly preferably 1.2 to 12.0. The use of the content ratio of the carboxy group to the hydroxy group within the foregoing numerical range enables a more reliable formation of the pseudo-crosslinked structure described above in the second layer and better suppression of the deterioration in the scratch resistance of the second layer due to the incorporation of the polyester resin in the second layer.

Electrophotographic Belt

Figure 1A:
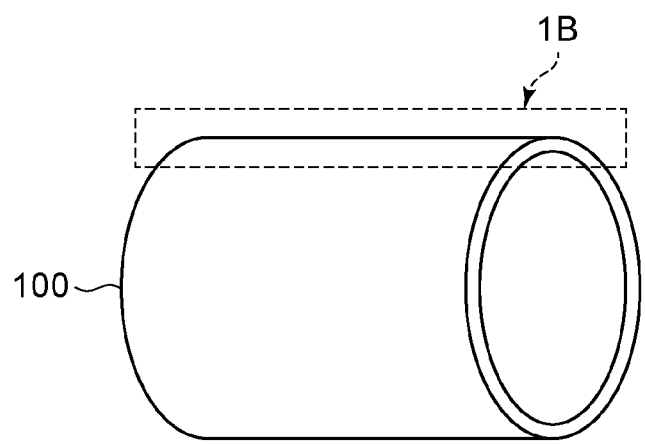
FIG. 1A is a schematic view of an electrophotographic belt according to an embodiment of the present disclosure, and is a perspective view of the electrophotographic belt having an endless shape.

An electrophotographic belt, according to at least one embodiment of the present disclosure, having an endless shape will be described in detail below with reference to FIGS. 1A and 1B. FIG. 1A is a perspective view of an electrophotographic belt 100.

Figure 1B:
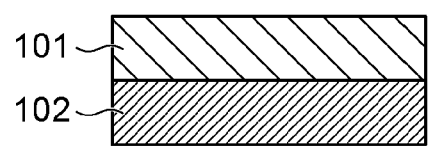
FIG. 1B is a schematic view of the electrophotographic belt according to an embodiment of the present disclosure, and is an enlarged axial sectional view of FIG. 1A.
Figure 1C:
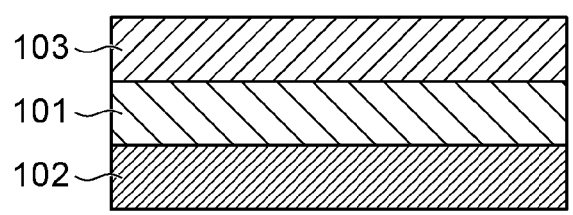
FIG. 1C is a schematic view of an electrophotographic belt according to an embodiment of the present disclosure.

FIG. 1B is an enlarged axial sectional view of FIG. 1A. In the electrophotographic belt 100, a second layer 102 is present on the inner peripheral surface of a base layer 101, and the second layer is exposed at the inner peripheral surface of the electrophotographic belt. Although not illustrated in the figure, a third layer, which comes into contact with a photoconductive drum and other components, may be provided on the outer peripheral surface of the base layer.

Coupling a voltage-maintaining element, such as a Zener diode, to the second layer via a member in contact with the second layer enables the potential of the second layer to be kept constant. This makes it possible to pass a desired current to all photoconductive drums through the second layer, resulting in an electrophotographic belt that can be used in an image-forming apparatus that enables not only secondary transfer but also primary transfer with a single transfer power supply, as described in Patent Literature 2.

The electrophotographic belt has an endless shape because it is stretched by a plurality of rollers. The endless shape refers, for example, to a shape that can be stretched and rotated by a plurality of rollers. Among endless belt shapes, a seamless shape with no joint (seam) is preferable from the viewpoint of reducing unevenness in belt thickness. The electrophotographic belt having the shape can be formed, for example, by joining sheet- or film-formed materials into a cylindrical shape or by extruding a resin material into a cylindrical shape.

The electrophotographic belt preferably has a volume resistivity of b $1\times10^9$ Ω·cm or more and $1\times10^{11}$ Ω·cm or less at an applied voltage of 250 V, as measured in a standard environment (a temperature of 23° C. and a humidity of 50%), for use in the compact, low-cost image-forming apparatus described above. It is preferable that the surface resistivity on the inner peripheral surface side be lower than that on the outer peripheral surface side, and that the surface resistivity measured from the inner peripheral surface side be $4.0\times10^6$Ω/□ or less. Such surface resistivity enables image defects, such as voids, due to insufficient transfer voltage required for primary transfer of a toner image on the outer surface of each of the photoconductive drums to a transfer belt, to occur less frequently.

Examples of the component materials of each of the layers of the electrophotographic belt and a method for manufacturing the electrophotographic belt will be described below. The method for manufacturing the electrophotographic belt is not specified in the following examples.

Base Layer (First Layer)

The base layer contains a polyester resin (first polyester resin) as a binder resin. Examples of the base layer include endless belts formed of cylindrically joined semi-conductive films of a first polyester resin-containing resin that contains a conductive agent; and cylindrical seamless belts.

First Polyester Resin

The first polyester resin can be prepared by polycondensation of a dicarboxylic acid component with a dihydroxy component, polycondensation of an oxycarboxylic acid component or a lactone component, or polycondensation using a plurality of components among them. The polyester resin can be either a homopolyester or a copolyester.

Examples of the dicarboxylic acid component include aromatic dicarboxylic acids, alicyclic dicarboxylic acids, aliphatic dicarboxylic acids, and derivatives of these dicarboxylic acids. Examples of the aromatic dicarboxylic acid include aromatic dicarboxylic acids each having 8 to 16 carbon atoms (C8 to C16) in its molecule. Specific examples thereof include terephthalic acid, isophthalic acid, phthalic acid, naphthalenedicarboxylic acids, such as 2,6-naphthalenedicarboxylic acid, diphenyldicarboxylic acid, diphenyl ether dicarboxylic acid, diphenylmethanedicarboxylic acid, and diphenylethanedicarboxylic acid. Examples of the alicyclic dicarboxylic acid include C4-C10 cycloalkanedicarboxylic acids, such as cyclohexanedicarboxylic acid. Examples of the aliphatic dicarboxylic acid include C4-C12 aliphatic dicarboxylic acids, such as succinic acid, adipic acid, azelaic acid, and sebacic acid. Examples of derivatives of these dicarboxylic acids include derivatives capable of forming esters (e.g., lower alkyl esters, such as dimethyl esters, acid anhydrides, and acid halides, such as acid chlorides). These dicarboxylic acid components can be used alone or in combination of two or more. Preferred dicarboxylic acid components are aromatic dicarboxylic acids, more preferably terephthalic acid, isophthalic acid, and naphthalenedicarboxylic acid, in view of their crystallinity and heat resistance.

Examples of the dihydroxy component include aliphatic diols, alicyclic diols, and aromatic diols. Examples of aliphatic diols include C2-C10 alkylene diols, such as ethylene glycol, propylene glycol, 1,3-butanediol, 1,4-butanediol, neopentyl glycol, and hexanediol. Examples of the alicyclic diols include C4-C12 alicyclic diols, such as cyclohexanediol and cyclohexanedimethanol. Examples of the aromatic diols include C6-C20 aromatic diols, such as hydroquinone, resorcinol, dihydroxybiphenyl, naphthalenediol, dihydroxydiphenyl ether, and 2,2-bis(4-hydroxyphenyl)propane (bisphenol A). Other examples thereof include alkylene oxide adducts of the aromatic diols (for example, C2-C4 alkylene oxide adducts of bisphenol A). Other examples further include polyoxyalkylene glycols (for example, polyoxy C2-C4 alkylene glycols, such as diethylene glycol, polyoxyethylene glycol, polyoxypropylene glycol, and polytetramethylene ether glycol). The dihydroxy component may be a derivative capable of forming an ester (for example, a component substituted with an alkyl group, an alkoxy group, or a halogen). These dihydroxy components can be used alone or in combination of two or more. Among these dihydroxy components, alkylene diols (especially C2-C4 alkylene diols) and alicyclic diols are preferably used in view of, for example, crystallinity and heat resistance.

Examples of the oxycarboxylic acid component include oxybenzoic acid, oxynaphthoic acid, diphenylene oxycarboxylic acid, 2-hydroxypropanoic acid, and derivatives of these oxycarboxylic acids. These oxycarboxylic acid components can be used alone or in combination of two or more.

Examples of the lactone component include C3-C12 lactones, such as propiolactone, butyrolactone, valerolactone, and caprolactone (for example, ε-caprolactone). These lactone components can also be used alone or in combination of two or more.

In addition, a multifunctional monomer may be used in combination to the extent that the crystallinity and the heat resistance are maintained. Examples of the multifunctional monomer include polyvalent carboxylic acids, such as trimellitic acid, trimesic acid, and pyromellitic acid; and polyhydric alcohols, such as glycerol, trimethylolpropane, trimethylolethane, and pentaerythritol. Polyesters having branched or cross-linked structures produced by the use of such polyfunctional monomers can also be used.

As the first polyester resin, a polyester resin obtained by polycondensation of the above components (the dicarboxylic acid component and the dihydroxy component, the oxycarboxylic acid component, the lactone component, or a plurality of components thereof) can be used. At least one selected from poly(alkylene terephthalate), poly(alkylene naphthalate), and block/random copolymers of poly(alkylene terephthalate) and poly(alkylene isophthalate) is preferred in view of their crystallinity, heat resistance, and other properties. Examples of the copolymers include block copolymers and random copolymers. The number of carbons of alkylene in each of poly(alkylene terephthalate), poly(alkylene isophthalate), and poly(alkylene naphthalate) is preferably 2 or more and 16 or less in view of crystallinity and heat resistance. At least one selected from poly(ethylene terephthalate), block/random copolymers of poly(ethylene terephthalate) and poly(ethylene isophthalate), and poly(ethylene naphthalate) is more preferred.

The first polyester resin may be a blend or an alloy of two or more. Specific examples of poly(ethylene naphthalate) include commercially available TN-8050SC (trade name, available from Teijin Limited) and TN-8065S (trade name, available from Teijin Limited). An example of poly(ethylene terephthalate) is commercially available TR-8550 (trade name, available from Teijin Limited). An example of a copolymer of poly(ethylene terephthalate) and poly(ethylene isophthalate) is commercially available PIFG30 (trade name, available from Bell Polyester Products, Inc).

The first polyester resin preferably has an intrinsic viscosity of 1.4 dl/g or less, more preferably 0.3 dl/g or more and 1.2 dl/g or less, even more preferably 0.4 dl/g or more and 1.1 dl/g or less. An intrinsic viscosity of 1.4 dl/g or less can efficiently prevent a decrease in flowability during molding. An intrinsic viscosity of 0.3 dl/g or higher can efficiently ensure high strength and high durability. The intrinsic viscosity of the polyester resin is measured using a solution of the polyester resin in o-chlorophenol, which is used as a solvent for diluting the polyester resin, the solution having a concentration of 0.5% by mass and a temperature of 25° C.

The first polyester resin is preferably 50% or more by mass, particularly 60% or more by mass, more preferably 70% or more by mass, based on the total mass of the base layer. At 50% or more by mass, a deterioration in the durability of the electrophotographic belt can be efficiently prevented.

Conductive Agent

A nonionic or ionic conductive agent can be used as a conductive agent in the base layer. As the conductive agent, a high-molecular-weight type or low-molecular-weight type conductive agent can be used. Examples of a high-molecular-weight type nonionic conductive agent that can be used include poly(ether ester amide), poly(ethylene oxide-epichlorohydrin) and poly(ether ester). Examples of a high-molecular-weight type ionic conductive agent that can be used include quaternary ammonium group-containing acrylate polymers as cationic conductive agents; and polystyrene sulfonic acid as an anionic conductive agent. Examples of a low-molecular-weight type nonionic conductive agent that can be used include ether group-containing derivatives and ether ester-containing derivatives. Examples of a low-molecular-weight type ion conductive agent that can be used include primary to tertiary ammonium salts and quaternary ammonium salts and their derivatives as cationic conductive agents; and carboxylic acid salts, sulfate salts, sulfonic acid salts, phosphate ester salts, and derivatives thereof as anionic conductive agents. These high-molecular-weight type and low-molecular-weight type conductive agents can be used alone or in combinations of two or more. Among these, quaternary ammonium salts, sulfonic acid salts, and poly(ether ester amide) are preferably used in view of their heat resistance and electrical conductivity.

Additives, such as plasticizers, antioxidants, decomposition inhibitors, crystal control agents, roughness adjusters, crosslinking agents, pigments, fillers, and elastomers, can be added to the base layer, as needed.

Method for Forming Base Layer

The base layer can be formed, for example, by the following method. When a thermoplastic resin is used as a resin, an ionic surfactant serving as a conductive agent, the resin, and, if necessary, an additive are mixed together and melt-kneaded with, for example, a twin-screw kneader to produce semi-conductive pellets. The pellets can then be extruded by melt extrusion into a sheet shape, a film shape, or a seamless-belt shape to produce a semi-conductive film. The molding can also be done by heat pressing or injection molding. The formed preform can be subjected to stretch-blow molding to produce a semi-conductive film. The base layer preferably has a thickness of 20 μm or more and 500 μm or less, more preferably 30 μm or more and 150 μm or less.

With regard to the electrical resistance of the base layer thus obtained, the volume resistivity at an applied voltage of 250 V is preferably $1.0\times10^8$ Ω·cm or more and $1.0\times10^{12}$ Ω·cm or less. The surface resistivity is preferably $1.0\times10^8$Ω/□ or more and $1.0\times10^{12}$Ω/□ or less. Controlling the electrical resistance within the semiconducting region can suppress defects in a transferred image due to insufficient transfer voltage caused by charge-up in low-humidity environments or during continuous driving.

Second Layer

The second layer contains the second polyester resin and the acrylic resin (hereinafter, also referred to as a "binder resin"). The surface resistivity of the second layer at an applied voltage of 10 V, a temperature of 23° C., and a humidity of 50% is preferably $4.0\times10^6$Ω/□, more preferably $1.0\times10^6$Ω/□. The lower limit of the surface resistivity is not limited to a particular value. When the surface resistivity is within the above range, a primary transfer current equivalent to that in primary transfer with a plurality of transfer power supplies of the related art can be supplied to each of the photoconductive drums. The surface resistivity is a value measured by a method for measuring the surface resistivity of the second layer, as described below.

The second layer preferably has a thickness of 0.05 μm or more and 10 μm or less, more preferably 0.1 μm or more and 5 μm or less in view of flexibility. In consideration of the above thickness, the binder resin is preferably one that is soluble in a solvent and such that a thin layer containing the binder resin can be formed or such that a thin layer containing raw materials for the binder resin can be formed.

An average hardness of a region in the second layer may preferably be 0.10 GPa or more, and more preferably be 0.15 GPa or more, the region extending from a position 10% of the thickness of the second layer in the thickness direction from the outermost surface to a position 20% of the thickness of the second layer in the thickness direction from the outermost surface, the average hardness being measured by a nano-indentation measurement method with a Berkovich type indenter at the outer surface of the second layer. A region, near the outermost surface, extending from the outermost surface to a position less than 10% of the thickness of the second layer from the outermost surface is easily affected by the measurement environment, such as the vibration of the indenter. A region extending from a position more than 20% of the thickness of the second layer from the outermost surface to the base layer is easily affected by the base layer. For these reasons, these regions are excluded, and the average hardness in the region of 10-20% of the thickness of the second layer is calculated. By controlling the hardness of the second layer so that the average hardness in the region is 0.15 GPa or more, the occurrence of physical deterioration, such as abrasion or wear, due to rubbing against other sliding members (such as transfer rollers) in an electrophotographic apparatus can be suppressed even when images are output continuously. The upper limit of the average hardness in the region of the second layer is preferably, but not necessarily, 0.50 GPa or less because physical damage to sliding members mounted on a typical electrophotographic apparatus can be suppressed. That is, the average hardness in the region of the second layer is more preferably 0.15 GPa or more and 0.50 GPa or less, particularly preferably 0.20 GPa or more and 0.40 GPa or less. Examples of a method for increasing the hardness include a method in which the molecular weight of the polyester resin is increased; and a method in which a high-hardness filler or a cross-linking agent is added.

Second Polyester Resin

The second polyester resin used in the second layer preferably contains at least an aromatic polyester resin in view of its strength. Examples thereof include polyester resins containing monomer units originating from phthalic acid selected from the group consisting of terephthalic acid, o-phthalic acid, and isophthalic acid. Specific examples thereof include copolymers containing ethylene terephthalate units and ethylene o-phthalate units; and copolymers containing ethylene terephthalate units and ethylene isophthalate units. Other examples thereof include copolymers containing ethylene o-phthalate units and ethylene isophthalate units. These copolymers may be any of block copolymers and random copolymers. A mixture of two or more copolymers blended or alloyed may be used. The second layer preferably contains a plurality of polyesters having different chemical structures. In this case, the degree of amorphousness is increased to provide better adhesion to the base layer. The chemical structure of the polyester resin can be determined by extraction of the polyester from the second layer using an appropriate method, such as dissolution in a solvent and then isolation, followed by identification using pyrolysis-GC/MS, IR, NMR, and elemental analysis.

In addition to the above-mentioned second polyester resin, the second layer may contain other additives to the extent that the effects of the embodiment are not impaired. Specific examples thereof include molybdenum disulfide, boron nitride, silicon nitride, layered clay minerals, silicone particles, fluororesin particles, silicone oil, fluorinated oil, perfluoropolyethers, crystal control agents, and cross-linking agents. Other additives may be used alone or in combination of two or more.

Among these, when a cross-linking agent, such as diisocyanate, is added along with raw materials for the second polyester resin, the second polyester resin is a polymer containing a urethane bond in its molecule (polyester-urethane resin). The fact that the second polyester resin is a polyester-urethane resin is preferred from the viewpoint of improving the hardness of the second layer.

The polyester resin used for the second layer preferably has a glass transition temperature (Tg) of higher than 60° C. in view of heat resistance. At 60° C. or lower, printing in a high-temperature environment or an increase in temperature in an image-forming apparatus during continuous printing may soften the second layer to cause fusion with a member, such as a transfer roller, with which the second layer is in contact, thereby possibly leading to image defects. Tg of the binder resin can be calculated by separating the resin from the second layer and then observing an endothermic peak and the shift of the base line during an increase in temperature using a differential scanning calorimeter (DSC). The hydroxyl value of the polyester resin used in the second layer will be described in detail in Evaluation 5 below.

The weight-average molecular weight (Mw) of the above polyester resin is preferably, but not necessarily, 40,000 or more and 200,000 or less. A weight-average molecular weight of the polyester resin of 40,000 or more results in better hardness of the second layer. A weight-average molecular weight (Mw) of the polyester resin of 200,000 or less results in good solubility in a solvent and suppression of an increase in the viscosity of a paint, thereby more easily obtaining a desired thickness.

Acrylic Resin

The acrylic resin used for the second layer contains a carboxy group in its molecule.

An example of the acrylic resin is an acrylic resin containing a structural unit represented by structural formula (1).

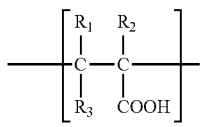

structural formula (1)

In structural formula (1), $R_1$ to $R_3$ are each independently a hydrogen atom or a hydrocarbon group having 1 or more and 3 or less carbon atoms.

A solvent-soluble polymer type is preferred. This is because the second layer can be formed by applying and drying a paint containing the acrylic resin.

Specific examples of the acrylic resin include acrylic resins containing monomer units, such as acrylate, methacrylate, methyl acrylate, methyl methacrylate, ethyl acrylate, and ethyl methacrylate, and containing a carboxy group in their molecules. These polymers may be any of block copolymers and random copolymers. A mixture of two or more copolymers blended or alloyed may be used.

The acid value (mgKOH/g) of the carboxy group-containing acrylic resin is preferably, but not necessarily, 70 mgKOH/g or more. The use of an acid value of 70 mgKOH/g or more enables suppression of a decrease in hardness even when the acrylic resin is used in combination with a polyester resin in the second layer, thereby providing good scratch resistance. A method for measuring the acid value will be described in detail in Evaluation 5 below.

The weight-average molecular weight (Mw) of the above-described acrylic resin is preferably, but not necessarily, 5,000 or more and 200,000 or less. A weight-average molecular weight of the acrylic resin of 5,000 or more results in better hardness of the second layer. A weight-average molecular weight (Mw) of the acrylic resin of 200,000 or less results in good solubility in a solvent and suppression of an increase in the viscosity of a paint, thereby more easily obtaining a desired thickness. For example, a commercially available, solventless acrylic polymer "ARUFON UC-3000" series (trade name, available from Toagosei Co., Ltd.) can be used as the acrylic resin. Specific examples thereof include "ARUFON UC-3000", acid value=74 mgKOH/g, and Mw=10,000; "ARUFON UC-3080", acid value=230 mgKOH/g, and Mw=14,000; "ARUFON UC-3510", acid value=70 mgKOH/g, and Mw=2,000; "ARUFON UC-5080", acid value=170 mgKOH/g, and Mw=17,000; and "ARUFON UC-5022", acid value=235 mgKOH/g, and Mw=14,000.

The acrylic resin content of the second layer is preferably, but not necessarily, 3% or more by mass, particularly preferably 5% or more by mass, based on the second layer from the viewpoint of improving the scratch resistance. In view of the adhesion to the polyester resin in the first layer, the acrylic resin content of the second layer is preferably 25% or less by mass, particularly preferably 20% or less by mass, based on the second layer.

Electro-Conductive Particle(s)

Specific examples of an electro-conductive agent that may be contained in the second layer to adjust the conductivity of the second layer are described below.

Examples thereof include carbon black, graphite, carbon nanotubes (hereinafter, also referred to as "CNTs"), carbon microcoils, graphene, zinc oxide, zinc antimonate, tin oxide, tin-doped indium oxide (ITO), antimony-doped tin oxide (ATO), and conductive polymers (such as polyaniline, polypyrrole, and polythiophene).

Among these, "Ketjen Black" (registered trademark) is preferred because of its high electrical conductivity. The carbon black content of the second layer is preferably, but not necessarily, 6% or more by mass for adjusting the surface resistivity to the value described above. From the viewpoint of more reliably suppressing a deterioration in physical properties, such as cracking and abrasion, caused by rubbing against other sliding members (for example, transfer rollers and tension rollers), the carbon black content of the second layer is preferably 15% or less by mass. That is, the carbon black content of the second layer is preferably 6% or more by mass and 15% or less by mass, more preferably 9% or more by mass and 13% or less by mass.

The carbon black content can be determined from the amount of residue left after the pyrolysis reaction of the second layer. Carbon black has the highest thermal decomposition temperature among materials constituting the second layer. Thus, a sample of the second layer is scraped from the electrophotographic belt, weighed, and treated in an air atmosphere using a thermogravimetric analyzer (TGA) at a temperature of higher than or equal to the decomposition temperature of the binder resin and lower than the decomposition temperature of the carbon black to promote the pyrolysis reaction. Thereby, the content can be calculated. With regard to the specific conditions, the temperature is increased to 500° C. at a rate of temperature increase of 20° C./min and then held for several hours to promote pyrolysis reaction of the materials, except for carbon black. When the weight loss rate is less than or equal to 1%/hour, it can be determined that the pyrolysis reaction has been completed. The carbon black content may be calculated from the amount of carbon black added during the formation of the second layer.

Method for Forming Second Layer

The second polyester resin and the acrylic resin are preferably soluble in a solvent, such as methyl ethyl ketone, methyl isobutyl ketone, or cyclohexanone. The reason for this is that the second layer can be formed by the application of a paint containing the polyester resin and the acrylic resin, which is advantageous in terms of cost.

Specifically, for example, a method for forming the second layer includes the steps of applying a second layer-forming paint containing a polyester resin, an acrylic resin, a solvent that dissolves the resins, and carbon black onto a surface of the base layer to form a coating film, and then removing the solvent.

The polyester resin can be obtained from raw materials, such as dicarboxylic acid and diol, through a transesterification and polycondensation. Alternatively, a commercially available polyester resin-containing paint can be used. In addition, the second layer-forming paint may contain an additive, such as a leveling agent, as needed. As the leveling agent, any known leveling agent can be selected and used as appropriate. The resulting second layer-forming paint is applied to the inner peripheral surface or outer peripheral surface of the base layer by an application method, such as dip coating, spray coating, ring coating, or roll coating. The solvent can then be removed by drying to form the second layer as a coating film.

Third Layer

For the purpose of preventing, for example, adhesion to other contact members, such as a photoconductive drum and a cleaning blade, and blocking, a third layer 103 may be provided in such a manner that of the inner peripheral surface and the outer peripheral surface of the base layer, the third layer 103 is in direct contact with the surface of the base layer that is not covered with the second layer (see FIG.

1C). The third layer may contain a resin. The resin is preferably, but not necessarily, soluble in a solvent and capable of being formed into a thin layer in consideration of the thickness of the third layer. Examples of the resin include soluble polyimides, polyester resins, and curable urethane and acrylic resins. These can be used alone or in combination. The same paint as the second layer-forming paint may also be used to form the third layer.

In addition to the above-mentioned resin, filler particles and a lubricant are preferably added to the third layer as additives. Specifically, the following can be exemplified. Examples thereof include alumina, titania, silica, zirconia, zinc oxide, zinc antimonate, tin oxide, tin-doped indium oxide (ITO), antimony-doped tin oxide (ATO), molybdenum disulfide, boron nitride, silicon nitride, and layered clay minerals. Other examples include silicone particles, fluororesin particles, such as polytetrafluoroethylene (PTFE) particles, carbon black, graphite, carbon nanotubes, carbon microcoils, and graphene. Furthermore, silicone oil, fluorinated oil, and perfluoropolyethers are exemplified. Among these, PTFE particles are preferred from the viewpoint of reducing friction. These may be used alone or in combination of two or more.

When the PTFE particles are used, the PTFE particle content of the third layer is preferably 5 parts or more by mass and 60 parts or less by mass, more preferably 10 parts or more by mass and 50 parts or less by mass, based on 100 parts by mass of the resin in the third layer. The use of the PTFE particle content within the above range enables the prevention of blocking and adhesion to other contact members. A conductive agent, a curing agent, an antioxidant, an ultraviolet absorber, a pH adjuster, a cross-linking agent, a pigment, and so forth can be added to the third layer, as needed.

The outer surface of the third layer opposite to the side facing the base layer preferably has grooves. When the outer surface has the grooves, the contact area with a member, such as a cleaning blade, in contact with the outer surface, (hereinafter, also referred to as a "contact member"), can be reduced, thereby further reducing the frictional resistance between the outer surface and the contact member.

Examples of a usable method for forming the grooves include, but are not limited to, a method in which the inner peripheral surface of an electrophotographic belt including a third layer is supported by a core, and then the electrophotographic belt is rotated in the circumferential direction while the outer surface of the third layer is brought into contact with an abrasive grain-containing lapping film to polish the outer surface; and an imprinting process in which a mold previously processed into a desired shape is brought into contact with the outer surface.

Figure 4:
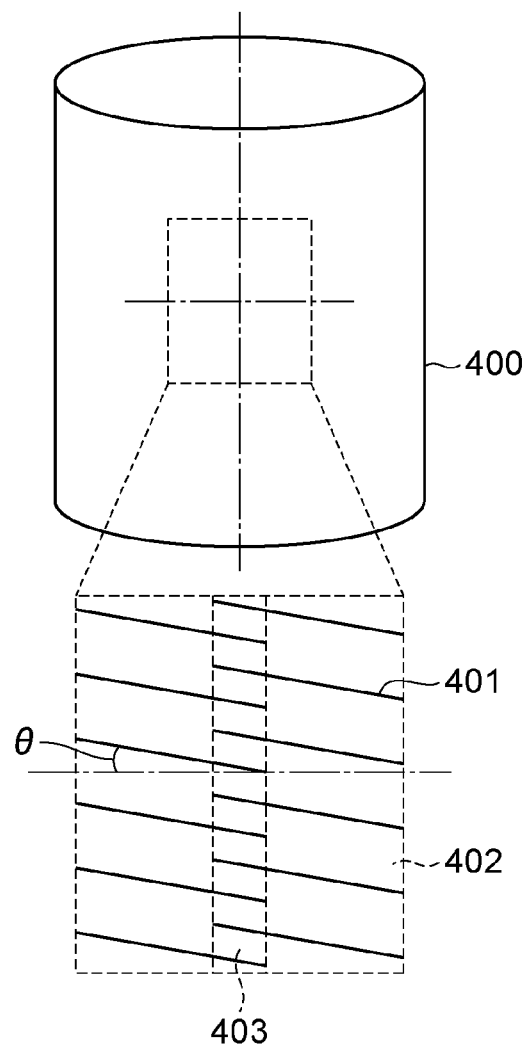
FIG. 4 is a schematic view of the outer peripheral surface of an electrophotographic belt according to an embodiment of the present disclosure.

FIG. 4 illustrates an electrophotographic belt 400 having an endless shape according to at least one other embodiment of the present disclosure, in which the outer surface of a third layer has grooves.

A plurality of grooves 401 are provided on the outer peripheral surface of the electrophotographic belt 400.

Each of the grooves 401 is formed so as to intersect with a line that is assumed to be drawn extending in a direction perpendicular to the circumferential direction of the electrophotographic belt. More specifically, each of the grooves 401 is provided in the circumferential direction of the electrophotographic belt 400 and is non-parallel to the circumferential direction. A minor angle θ formed between each of the grooves 401 and the circumferential direction is preferably more than 0° and less than ±3°. More preferably, the angle θ is less than ±1°. When the angle of the grooves 401 with respect to the circumferential direction is 0°, that is, when the grooves 401 extend parallel to the circumferential direction of the electrophotographic belt, a portion of a cleaning blade in contact with a region (hereinafter, also referred to as a "land portion") sandwiched between two adjacent grooves 401 of the electrophotographic belt is fixed, and only the portion may be worn to cause cleaning failure.

The outer peripheral surface of the electrophotographic belt preferably consists only of a first region 402, where the number of grooves in the direction perpendicular to the circumferential direction thereof is n, and a second region 403, where the number of grooves in the direction perpendicular to the circumferential direction is more than n. In this case, the first region and the second region are arranged alternately in the circumferential direction. The number n of grooves 401 can be any number as long as toner removal cleaning can be stably performed, and the number is preferably 2,000 to 120,000. The presence of 2,000 or more grooves enables a reduction in the area of a portion of the cleaning blade in contact with a portion where none of the grooves 401 are provided, thereby reducing the friction force generated between the cleaning blade and the electrophotographic belt 400. The presence of 120,000 or less grooves allows toner on the grooves 401 to be transferred better.

The number of grooves in the second region is preferably (2n−10) or more and (2n+10) or less. When the number of the grooves in the second region is (2n−10) or more, it is possible to stably change the location of the contact portion of the cleaning blade at the boundaries between the first region and the second region. When the number of the grooves in the second region is (2n+10) or less, the toner on the grooves can be transferred better.

With regard to each of the grooves, the spacing between adjacent grooves is preferably, but not necessarily, approximately equal in view of toner removal cleaning. Equal spacing can reduce local blade wear.

The length of the second region in the circumferential direction is preferably 0.01 to 50 mm. Each of the grooves is discontinuous in the circumferential direction, and the second region may include an end of each groove. When the length of the second region in the circumferential direction is 50 mm or less, the toner on the grooves can be transferred better.

One or more second regions are present on the surface of the electrophotographic belt 400. In particular, two or three second regions are preferably present in the circumferential direction. The presence of two or three second regions in the circumferential direction of the electrophotographic belt allows the toner on the grooves to be transferred better.

The depth of each of the grooves 401 is preferably 0.10 μm or more and less than 5.0 μm, more preferably 0.20 μm or more and less than 2.0 μm. When the depth of the grooves is within the above range, the contact state of the cleaning blade with the electrophotographic belt can be stabilized over a long period of time.

The thickness of the third layer is preferably 0.05 μm or more and 10 μm or less, more preferably 0.1 μm or more and 5 μm or less in view of cracking and flexibility.

Electrophotographic Apparatus

A color electrophotographic apparatus according to an embodiment of the present disclosure, in which the electrophotographic belt according to an embodiment of the present disclosure is used as an intermediate transfer belt, will be described with reference to FIG. 2.

The electrophotographic apparatus includes an image-forming unit 205a that forms a yellow image, an image-forming unit 205b that forms a magenta image, an image-forming unit 205c that forms a cyan image, and an image-forming unit 205d that forms a black image. Each of the image-forming units includes a photoconductive drum 205-1 that is a toner image-bearing member configured to support a toner image on a surface thereof. Each photoconductive drum is in contact with the outer peripheral surface of an intermediate transfer belt 200 formed of an electrophotographic belt according to an embodiment of the present disclosure.

The intermediate transfer belt 200 is supported by three rollers of a driving roller/secondary transfer opposite roller 201 and stretching rollers 202 and 203. The driving roller/secondary transfer opposite roller 201 includes a rubber layer that is disposed on a surface layer and that has a high frictional resistance in order to drive the intermediate transfer belt 200. The rubber layer is electrically conductive and has a volume resistivity of $1.0 \times 10^5$ Ω·cm or less. The driving roller/secondary transfer opposite roller 201 and a secondary transfer roller 204 are included in a secondary transfer section with the intermediate transfer belt 200 provided therebetween. The stretching roller 202 includes a rubber layer. The rubber layer is electrically conductive and has a volume resistivity of $1.0 \times 10^5$ Ω·cm or less. The stretching roller 203 can be a metal roller. The secondary transfer roller 204 is pressed against the driving roller/secondary transfer opposite roller 201 with the intermediate transfer belt 200 provided therebetween. As the secondary transfer roller 204, an elastic roller having a volume resistivity of $1.0 \times 10^7$ Ω·cm or more and $1.0 \times 10^9$ Ω·cm or less can be used. The stretching rollers 202 and 203 and the secondary transfer roller 204 are driven to rotate by the intermediate transfer belt 200.

The secondary transfer roller 204 is in contact with the outer peripheral surface of the intermediate transfer belt 200, except for a secondary transfer process. A power supply 214 applies a voltage to the secondary transfer roller 204 to allow a current to flow from the secondary transfer roller 204 to the respective photoconductive drums included in the image-forming units through the intermediate transfer belt 200. This allows a toner image carried by each photoconductive drum to be primarily transferred from the photoconductive drum to the intermediate transfer belt 200. In other words, the secondary transfer roller 204 functions as a current supply member that supplies a current to the intermediate transfer belt 200 when the toner images carried by the photoconductive drums are primarily transferred to the outer peripheral surface of the intermediate transfer belt 200. As described above, in the electrophotographic apparatus, the power supply for primary transfer and the power supply for secondary transfer are used in common.

The electrophotographic apparatus will be described in detail below by taking the image-forming unit 205a as an example.

Figure 3:
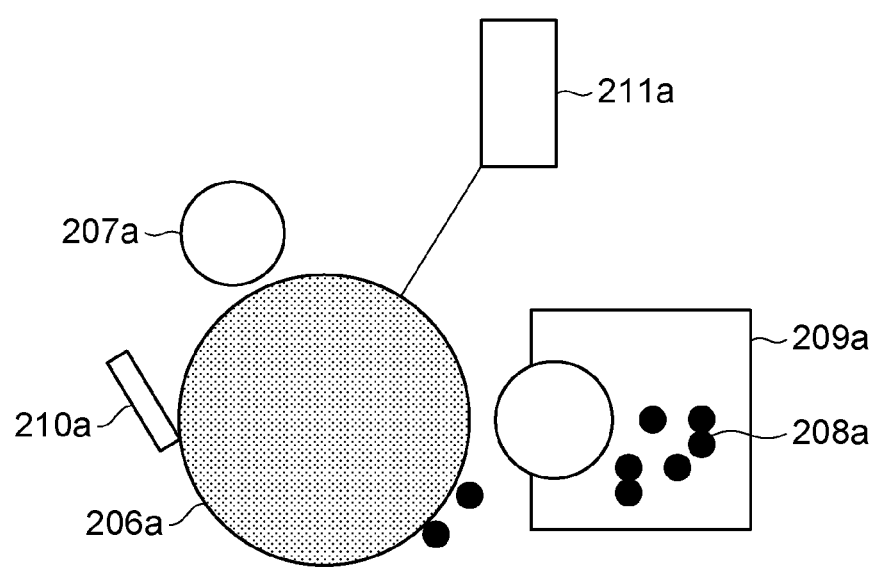
FIG. 3 is an enlarged schematic view of an image-forming unit 205a in FIG. 2.

FIG. 3 is an enlarged schematic view of the image-forming unit 205a. The image-forming unit 205a includes a photoconductive drum 206a serving as an image carrier and is driven to rotate at a predetermined process speed. Around the photoconductive drum 206a, a charging roller 207a serving as a charging member, a developing member 209a containing a toner 208a, and a drum cleaning member 210a are arranged. Around the photoconductive drum 206a, an exposure member 211a is further arranged between the charging roller 207a and the developing member 209a. The photoconductive drum 206a is charged by the charging roller 207a, and the charged electrostatic latent image-bearing member is exposed by the exposure member 211a to form an electrostatic latent image (toner image). After that, the electrostatic latent image is developed by the toner 208a triboelectrically charged in the developing member 209a. The developed image is transferred to the intermediate transfer belt 200 located at a position facing each image-forming unit by application of a primary transfer voltage (hereinafter, referred to as "primary transfer").

Similarly, in the image-forming units 205b, 205c and 205d, the primary transfer is performed in synchronization with the rotation of the intermediate transfer belt 200 to form a four-color composite toner image. At that time, one or more metal rollers 212 serving as primary transfer opposite members are preferably arranged between the image-forming units 205b and 205c and at positions opposite the image-forming units with the intermediate transfer belt 200 therebetween. A primary transfer section is formed by using each metal roller 212 pressing the intermediate transfer belt 200 against the image-forming unit facing the intermediate transfer belt 200, such that a primary transfer width (nip) can be widened and stabilized.

A recording medium 213, such as paper, is fed to a position on the intermediate transfer belt 200, the position being located downstream from the position of the fourth image-forming unit 205d. The secondary transfer roller 204 (secondary transfer member) is disposed at the same position. The gap between the intermediate transfer belt 200 and the secondary transfer roller 204 and its vicinity, where a toner image on the intermediate transfer belt 200 is transferred to the recording medium, are referred to as the secondary transfer section. The secondary transfer section preferably includes a nip between the driving roller/secondary transfer opposite roller 201 and the secondary transfer roller 204, as illustrated in FIG. 2. When a non-image portion immediately preceding the composite toner image formed on the intermediate transfer belt 200 reaches the secondary transfer section, a voltage of opposite polarity to the toner is applied from the voltage power supply 214 that supplies a current to the secondary transfer roller 204. Then, when the recording medium 213 passes the secondary transfer section in a direction indicated by an arrow Vf in FIG. 2, the four-color composite toner image on the intermediate transfer belt 200 is transferred to the recording medium 213 in one operation. This transfer is referred to as "secondary transfer". The recording medium 213 on which the secondary transfer is performed is subjected to a fixing process in a fixing unit (not illustrated) to form a color image. The toner remaining on the intermediate transfer belt 200 without undergoing secondary transfer is scraped off by a cleaning blade 215 that comes into contact with the belt surface where the stretching roller 202 is located at any given time, and is collected in a waste toner box 216. In this way, the surface of the intermediate transfer belt 200 returns to its initial state.

The electrophotographic apparatus according to an embodiment of the present disclosure acquires, from the voltage power supply 214, the transfer voltage required for the primary transfer in addition to the transfer voltage required for the secondary transfer. The intermediate transfer belt 200 includes, for example, the second layer on the inner peripheral surface of the belt. As illustrated in FIG. 2, each metal roller 212, which is in contact with the inner peripheral surface of the intermediate transfer belt, is connected to a Zener diode 217, which is a constant-voltage device, and is grounded. Thus, the voltage applied from the voltage power supply 214 allows the potential of the second layer of the intermediate transfer belt to be constant in the circumferential direction. Accordingly, substantially the same potential difference is applied between the intermediate transfer belt and the photoconductive drum of each of the image-forming units 205*a*, 205*b*, 205*c*, and 205*d*, and substantially the same current flows to each photoconductive drum. This enables primary transfer. The resistance of the recording medium itself varies in accordance with environmental changes, such as changes in temperature and humidity, during image formation; thus, the secondary transfer voltage is preferably changed within a certain range.

In the electrophotographic apparatus, in the case of the change in the secondary transfer voltage, for example, a higher secondary transfer voltage, since the Zener diode 217 is connected, a current flows when the Zener potential is exceeded. This enables the potential of the second layer to be maintained at a constant level, thereby stabilizing the primary transferability. Specifically, it is preferable that the applied voltage of the voltage power supply 214 be 1,000 to 3,500 V and the Zener potential be 220 to 300 V. According to the embodiment, since the above-described transfer configuration is provided, the primary transfer and the secondary transfer can be stably performed by using a single transfer power supply.

EXAMPLES

Examples and comparative examples will be described below.

In the following examples and comparative examples, materials in a paint may be diluted with or dispersed in a solvent. The amount of each material used (parts by mass) is an amount based on a non-volatile content unless otherwise specified, and indicates an amount excluding the solvent (volatile component).

Table 1 presents materials used for second layers of electrophotographic belts Nos. 1 to 17 according to Examples 1 to 7, Comparative examples 1 to 9, and Reference example 1. Table 2 presents evaluation results of electrophotographic belts Nos. 1 to 17.

Example 1

Formation of Base Layer

The following materials were provided as raw materials for forming a base layer.

- Poly(ethylene naphthalate) as a polyester resin (trade name: Teonex TN8050SC, available from Teijin Limited) (hereinafter, referred to as "PE(1)")
- A copolymer of poly(ethylene terephthalate) and poly(ethylene isophthalate) (trade name: PIFG30, available from Bell Polyester Products Inc.) (hereinafter, referred to as "PE(2)")
- Poly(ether ester amide) (trade name: TPAE-10HP-10, available from T&K Toka Co., Ltd.) (hereinafter, referred to as "PEEA")
- Potassium perfluorobutanesulfonate (trade name: Eftop KFBS, available from Mitsubishi Materials Electronic Chemicals Co., Ltd.) (hereinafter, referred to as "KFBS")

PE(1) had a melting point of 262° C.

PE(1)/PE(2)/PEEA/KFBS described above were mixed in a ratio of 72/8/18/2 (% by mass) and melt-kneaded at 290° C. for 5 minutes with a twin-screw extruder (trade name: TEX30a, available from The Japan Steel Works, Ltd.) to prepare a resin mixture of PE(1), PEEA, and KFBS. The resulting resin mixture was pelletized with a cutter (trade name: Fan-Cutter, available from Hoshi Plastic Co., Ltd.) to produce pellets of the resin mixture (pellet size: major axis 3 mm×minor axis 2 mm). The resulting pellets were dried at 140° C. for 6 hours. The dry pellets of the resin mixture were fed into the hopper of an injection molding machine (trade name: SE180D, available from Sumitomo Heavy Industries, Ltd). The cylinder temperature was set to 290° C. The pellets were melted under stirring of the screws and injection-molded into a mold to form a preform having a test-tube shape. The resulting preform was placed into a blow molding machine and subjected to blow molding with a stretch rod and an air force at a preform temperature of 155° C., an air pressure of 0.3 MPa, and a stretch-rod speed of 1,000 mm/s in a blow mold with the mold temperature maintained at 110° C. to produce a blown bottle. The blown bottle was cut at both ends to give an endless belt-shaped base layer for electrophotography. The base layer had a thickness of 70 µm.

Preparation of Polyester Resin for Second Layer

First, 194 parts by mass of dimethyl terephthalate, 194 parts by mass of dimethyl isophthalate, 239 parts by mass of ethylene glycol, and 38 parts by mass of diethylene glycol were placed in an autoclave. Next, 0.2 parts by mass of tetrabutyl titanate serving as a catalyst was placed in the autoclave, and a transesterification reaction was allowed to proceed at 190° C. to 220° C. for 5 hours. The pressure in the reaction system was reduced to 0.67 kPa (5 mmHg) over a period of 20 minutes while the temperature was increased to 280° C. during this period. The polycondensation reaction was performed at 13.3 Pa (0.1 mmHg) and 280° C. for 60 minutes to give polyester (1) having monomer units originating from isophthalic acid and terephthalic acid. The DSC measurement revealed that polyester (1) thus prepared had a glass transition temperature of 65° C.

Formation of Second Layer

The following raw materials were used for the formation of a second layer.

- Commercially available ARUFON UC-3000, as an acrylic resin, (trade name, acid value=74 mgKOH/g, weight-average molecular weight Mw=10,000, available from Toagosei Co., Ltd.) containing a carboxy group (hereinafter, referred to as "acrylic resin (1)")
- Polyester (1) described above
- Carbon black (trade name: MHI Black #273, available from Mikuni-Color Ltd.) (hereinafter, referred to as "carbon")

Acrylic resin (1)/polyester (1)/carbon described above were mixed in a ratio of 8.1/81.3/10.6 (% by mass). The resulting mixture was diluted with methyl ethyl ketone to a solid concentration of 15% by mass. The mixture was stirred with a stirrer to prepare a uniform second layer-forming paint. This paint was uniformly applied to the inner peripheral surface of the base layer by a spray method and dried at 70° C. for 5 minutes. This resulted in electrophotographic belt No. 1 including a 2-µm-thick second layer on the inner peripheral surface of the base layer. Electrophotographic belt No. 1 was subjected to evaluations 1 to 6 described below.

Evaluation 1: Measurement of Average Hardness of Second Layer

The hardness of the second layer was measured with a micro-indentation hardness tester (trade name: Nanoindenter G200, available from Agilent Technologies) using a Berkovich type indenter. The measurement region was a region ranging from 10-20% in the thickness direction from the outermost surface of the second layer, and the average hardness in this region was calculated. Table 2 presents the results. In Table 2, "N" indicates that the evaluation was impossible because the acrylic resin and the polyester resin were phase-separated and the surface of the coating film was significantly non-uniform.

Evaluation 2: Measurement of Resistivity

The surface resistivity of the second layer was measured with a resistivity meter (trade name: Hyresta UP MCP-HT450, available from Mitsubishi Chemical Analytic Co., Ltd.) in accordance with Japanese Industrial Standard (JIS) K 6911. The surface resistivity of the second layer was measured as follows: In an environment with a temperature of 23° C. and a relative humidity of 50%, a URSS probe was brought into contact with the second layer, and a value at an applied voltage of 10 V and a measurement time of 10 seconds was defined as a measured value. The measurement was performed at four points spaced 90° apart in the circumferential direction of the second layer, and the average value of these measured values was calculated. The volume resistivity of the electrophotographic belt including the base layer and the second layer was measured as follows: In the environment described above, a UR probe was brought into contact with the outer peripheral surface of the belt, and a value at an applied voltage of 250 V and a measurement time of 10 seconds was defined as a measured value. The measurement was performed at four points spaced 90° apart in the circumferential direction of the electrophotographic belt, and the average value of these measured values was calculated. Table 2 presents the results.

Evaluation 3: Evaluation of Scratch Resistance

Second layers were formed in the same manner as described above, except that paints prepared in Examples and Comparative examples were applied to glass plates in place of the base layers described above. The scratch resistance of each of the second layers was evaluated as follows: A steel wool (#0000) was brought into contact with a surface of a sample held on a reciprocating abrasion tester and reciprocated 50 times at a load of 500 g and a reciprocating speed of 10 cm/s. Before and after the test, a gloss at an angle of 60° to the surface of the coating film was measured with a glossmeter (IG-320, available from Horiba, Ltd). The percentage of the quotient of the post-test gloss level divided by the pre-test gloss level was defined as a gloss retention rate and used as an index of scratch resistance. The measurement results were evaluated on the basis of the following criteria.

Rank A (very good scratch resistance): The gloss retention rate was 75% or more.
Rank B (good scratch resistance): The gloss retention rate was 55% or more and less than 75%.
Rank C (poor scratch resistance): The gloss retention rate was less than 55%.

Evaluation 4: Evaluation of Adhesion

The transfer belts produced in Examples and Comparative examples were evaluated in accordance with JIS K5400. Lines that reached the interface between the base layer and the second layer were scored with a cutting tool to create a grid of 100 squares each measuring 1 mm×1 mm. An adhesive tape (trade name: Cellophane Tape, available from Nichiban Co., Ltd.) was adhered thereto and then removed by pulling in a direction at an angle of 90°. The results were evaluated according to criteria below.

Rank A (very good: No delamination was observed at all)
Rank B (good: Minor delamination was observed at some intersections of the cuts)
Rank C (Partial or full delamination was observed along the lines of the cuts)

Evaluation 5: Measurement of Acid Value and Hydroxyl Value

The acid value of each of the acrylic resins and the hydroxyl value of each of the polyester resins were determined by, with reference to Japanese Industrial Standard (JIS) K0070, performing an acid-value titration analysis and a hydroxyl-value titration analysis, and performing calculations using computational expressions (1) and (2).

$$\text{Hydroxyl value (mgKOH/g)} = \{(V1-V0) \times f1 \times 0.5 \times 56.11\}/S1 + \text{acid value} \quad \text{Computational Expression (1)}$$

where in computational expression (1),
S1: mass of sample collected (g);
V0: amount of 0.5 mol/L solution of potassium hydroxide in alcohol required for blank test (mL);
V1: amount of 0.5 mol/L solution of potassium hydroxide in alcohol required for actual test (mL); and
f1: factor of 0.5 mol/L solution of potassium hydroxide in alcohol (1.005).

$$\text{Acid value (mgKOH/g)} = \{(V3-V2) \times f2 \times 0.1 \times 56.11\}/S2 \quad \text{Computational Expression (2)}$$

where in computational expression (2),
S2: mass of sample collected (g);
V2: amount of 0.1 mol/L solution of potassium hydroxide in alcohol required for blank test (mL);
V3: amount of the 0.1 mol/L solution of potassium hydroxide in alcohol required for actual test (mL); and
f2: factor of 0.1 mol/L solution of potassium hydroxide in alcohol (1.006).

The hydroxyl-value titration analysis will be described in detail below.

About 2 g of a sample to be measured and 5 mL of an acetylation reagent are placed into a 200-mL Erlenmeyer flask. An air condenser is attached thereto. The mixture is allowed to react in an oil bath with a temperature of 100° C. for 1 hour. After natural cooling at room temperature, 1 mL of water is added. The mixture is heated again in the oil bath with a temperature of 100° C. for another 10 minutes. After natural cooling, the inside of the air condenser and the inner wall surface of the flask are rinsed with ethanol. The resulting solution is diluted with 30 mL of pyridine. Titration is performed with a 0.5 mol/L solution of potassium hydroxide in alcohol (f=1.005) using a 1% phenolphthalein solution as an indicator. The point at which the solution turns pale red is defined as the end point.

A blank test is also performed in the same manner. The hydroxyl value is calculated from the above expression. The acetylation reagent is prepared by weighing 20 g of acetic anhydride in a flask and adding pyridine thereto to make 100 mL.

The acid-value titration analysis will be described in detail below.

To a 100-mL Erlenmeyer flask, 2 g of a sample, 30 mL of ethanol, and 30 mL of 2-butanone are placed. The sample is allowed to dissolve at room temperature. Titration is performed with a 0.1 mol/L solution of potassium hydroxide in alcohol (f=1.006) using a 1% phenolphthalein solution as an indicator. The point at which the solution turns red is defined as the end point. A blank test is also performed in the same manner. The acid value is calculated from the above expression.

The calculated acid value and hydroxyl value are calculated values per 1 g of the acrylic resin and polyester resin measured. Thus, the products of the values and the resin contents given in Table 1 were calculated, and the content ratios of "carboxy group/hydroxy group" were calculated.

Table 1 presents the acid values and the hydroxyl values, based on Evaluation 5 described above, of the binder resins used in the second layers of transfer belts according to Examples and Comparative examples described below.

Evaluation 6: Evaluation of Image Quality

Figure 2:
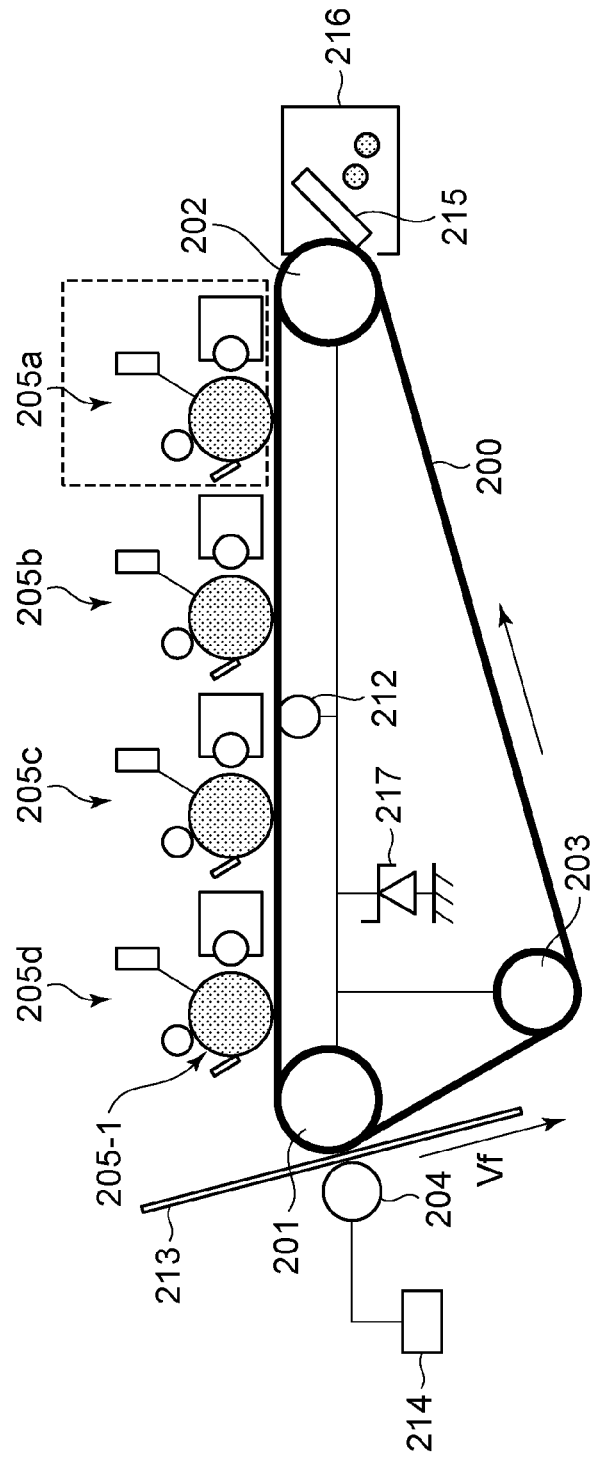
FIG. 2 is a schematic view of an electrophotographic image-forming apparatus according to another embodiment of the present disclosure.

Each of the resulting electrophotographic belts was used as the intermediate transfer belt of the electrophotographic image-forming apparatus having the structure illustrated in FIG. 2. Electrophotographic images were formed, and the presence or absence of image defects caused by secondary transfer was observed. Letter-size (width: 216 mm) plain paper (trade name: Business 4200, available from Xerox Corp., basis weight: 75 g/m$^2$) was used as paper. With regard to the print mode, secondary-color images each formed by superimposing solid images of two colors of toner output in a single-sided print mode were used. Here, each secondary-color image was an image having an average density of 200% of red (R), green (G), and blue (B). After the images of 150,000 sheets were output, the first output image (hereinafter, also referred to as "initial") and the 150,000th output image were evaluated. After outputting the above number of sheets, the electrophotographic belt was removed from the image-forming apparatus, and the surface of the second layer was visually observed. The presence or absence of the peeling of the second layer from the base layer and scratches on the second layer was evaluated according to criteria below.

Rank A: No peeling of the second layer from the base layer or scratches on the second layer were observed, and the output image was good.

Rank C: Peeling of the second layer from the base layer or scratches on the second layer were observed, and image defects caused by belt unevenness were observed in a portion of the output image corresponding to the spot in question.

Rank N: Image defects due to insufficient transfer voltage were observed.

Example 2

Electrophotographic belt No. 2 was produced as in Example 1, except that polyester (1) for the second layer of Example 1 was changed to a polyester-urethane resin (trade name: Vylon UR1400, available from Toyobo Co., Ltd.) (hereinafter, referred to as "polyester (2)") containing monomer units originating from terephthalic acid and isophthalic acid. DSC measurement indicated that polyester (2) had a glass transition temperature of 83° C. Electrophotographic belt No. 2 produced was subjected to evaluations 1 to 6 described above.

Example 3

Electrophotographic belt No. 3 was produced as in Example 2, except that the ratio of acrylic resin (1)/polyester (2)/carbon ratio was changed to 14.9/74.5/10.6 (% by mass). Electrophotographic belt No. 3 produced was subjected to evaluations 1 to 6 described above.

Example 4

Electrophotographic belt No. 3 was produced as in Example 3, except that the ratio of acrylic resin (1)/polyester (2)/carbon was changed to 20.6/68.8/10.6 (% by mass). Electrophotographic belt No. 3 produced was subjected to evaluations 1 to 6 described above.

Example 5

Electrophotographic belt No. 5 was produced as in Example 1, except that polyester (1) for the second layer of Example 1 was changed to a polyester-urethane resin (trade name: Vylon UR8200, available from Toyobo Co., Ltd.) (hereinafter, referred to as "polyester (3)") containing monomer units originating from o-phthalic acid and isophthalic acid. DSC measurement indicated that polyester (3) had a glass transition temperature of 73° C. Electrophotographic belt No. 5 produced was subjected to evaluations 1 to 6 described above.

Example 6

Electrophotographic belt No. 6 was produced as in Example 1, except that polyester (1) for the second layer of Example 1 was changed to a polyester-urethane resin (trade name: Vylon UR4800, available from Toyobo Co., Ltd.) (hereinafter, referred to as "polyester (4)") containing monomer units originating from terephthalic acid and isophthalic acid. DSC measurement indicated that polyester (4) had a glass transition temperature of 106° C. Electrophotographic belt No. 6 produced was subjected to evaluations 1 to 6 described above.

Example 7

The same paint as the second layer-forming paint described above was applied in the same manner as in Example 1 to the outer peripheral surface of the electrophotographic belt No. 1 produced in Example 1, thereby providing an electrophotographic belt 500 including a third layer.

Figure 5:
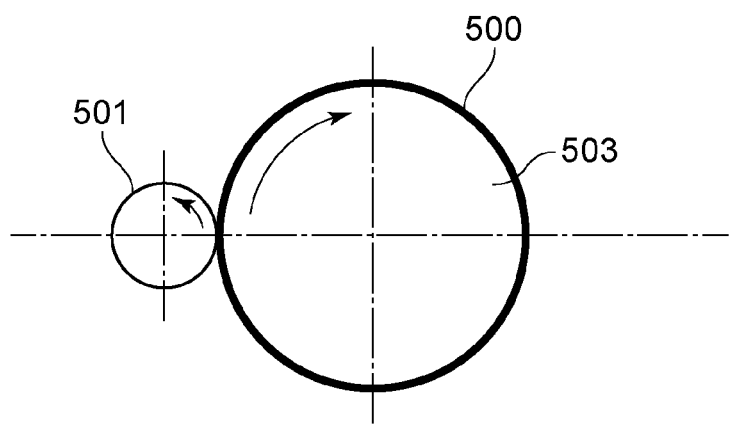
FIG. 5 is a schematic view illustrating a configuration of an imprint processing apparatus to form a groove on a surface of an electrophotographic belt.

Grooves were formed in the electrophotographic belt 500 using an imprint processing apparatus illustrated in FIG. 5. A die having a diameter of 50 mm and a length of 250 mm and being composed of a carbon steel (S45C) subjected to electroless nickel plating was provided as a groove-forming cylindrical die 501. The die had spirally continuous ridge patterns provided by cutting. The ridge patterns had a ridge height of 3.5 μm, a ridge bottom length of 2.0 μm, a ridge top length of 0.2 μm, and a ridge spacing of 20 μm. The angle of the ridge patterns of the groove-forming cylindrical die 501 with respect to the circumferential direction was 0.1°. The groove-forming cylindrical die 501 included an embedded cartridge heater inside and was capable of being heated.

The electrophotographic belt 500 was fitted to the outer periphery of a cylindrical belt-holding core 503 (peripheral length: 712 mm). Both the groove-forming cylindrical die 501 and the cylindrical belt-holding core 503 were capable of rotating on their own axes. Both of the die and the core were rotated at 30 mm/sec (rotation directions were opposite to each other), and the groove-forming cylindrical die 501 heated to 130° C. was pressed against the cylindrical belt-holding core 503 at a pressing force of 8.0 MPa while maintaining their shaft center lines parallel to each other. By this method, the ridge patterns of the groove-forming cylindrical die 501 were transferred to the outer peripheral surface of the electrophotographic belt 500, i.e., the outer surface of the third layer. When the rotation of the cylindrical belt-holding core 503 slightly passed one round (corresponding to 1 mm), the groove-forming cylindrical die 501 was separated from the outer surface of the electrophotographic belt 500. In this way, the electrophotographic belt No. 7 having grooves on the outer peripheral surface was produced.

Since the ridge patterns of the groove-forming cylindrical die 501 was the spiral shape, the starting end and the terminal end of each groove were not connected to each other after one rotation of the groove-forming cylindrical die during the groove formation. Thus, the outer surface of the electrophotographic belt No. 7 included a first region, where the number of grooves in the direction perpendicular to the circumferential direction thereof was n, and a second region, where the number of grooves in the direction perpendicular to the circumferential direction thereof was more than n. Specifically, the outer surface of the resulting electrophotographic belt No. 7 consisted of one first region and one second region. The number of grooves in the first region in the direction perpendicular to the circumferential direction was 12,200. The number of grooves in the second region in the direction perpendicular to the circumferential direction was 24,401. The length of the second region in the circumferential direction was 1.1 mm. The minor angle θ formed between each groove and the circumferential direction was 0.1°. Electrophotographic belt No. 7 produced was subjected to evaluations 1 to 6 described above.

Example 8

A third layer-forming paint was prepared as described below.
A mixture was obtained by mixing resin (1)/polyester (1) in a ratio of 9.1/90.9 (% by mass). The mixture was diluted with methyl ethyl ketone so as to have a solid concentration of 15% by mass. The resulting mixture was stirred with a stirrer to prepare a third layer-forming paint.
The third layer-forming paint was uniformly applied by a spray method to the outer peripheral surface of the base layer, of the electrophotographic belt No. 1 produced in Example 1, opposite to the surface covered with the second layer, and dried at 70° C. for 5 minutes. In this way, the third layer having a thickness of 2 μm was formed on the outer peripheral surface of the base layer. Then, grooves were formed on the outer surface of the third layer in the same manner as in Example 7 to provide electrophotographic belt No. 8. Electrophotographic belt No. 8 produced was subjected to evaluations 1 to 6 described above. Evaluations 1 to 4 and evaluation 6 were performed for the third layer in the same manner as for the second layer.

Comparative Example 1

Electrophotographic belt No. 9 was produced in the same manner as in Example 1, except that acrylic resin (1) was not used and the ratio of polyester (1)/carbon was changed to 89.4/10.6 (% by mass). Electrophotographic belt No. 9 produced was subjected to evaluations 1 to 6 described above.

Comparative Example 2

Electrophotographic belt No. 10 was produced in the same manner as in Example 1, except that acrylic resin (1) was changed to a functional group-free acrylic resin (trade name: ARUFON UP-1170; available from Toagosei Co., Ltd.) (hereinafter, referred to as "acrylic resin (2)"). Electrophotographic belt No. 10 produced was subjected to evaluations 1 to 6 described above.

Comparative Example 3

Electrophotographic belt No. 11 was produced in the same manner as in Comparative example 3, except that acrylic resin (2) was changed to a hydroxy group-containing acrylic resin (trade name: ARUFON UH-2000; available from Toagosei Co., Ltd.) (hereinafter, referred to as "acrylic resin (3)"). Electrophotographic belt No. 11 produced was subjected to evaluations 1 to 6 described above.

Comparative Example 4

Electrophotographic belt No. 12 was produced in the same manner as in Example 1, except that polyester (1) was not used and the ratio of acrylic resin (1)/carbon was changed to 89.4/10.6 (% by mass). Electrophotographic belt No. 12 produced was subjected to evaluations 1 to 6 described above.

Comparative Example 5

Electrophotographic belt No. 13 was produced in the same manner as in Comparative example 2, except that polyester (1) was not used and the ratio of acrylic resin (2)/carbon was changed to 89.4/10.6 (% by mass). Electrophotographic belt No. 13 produced was subjected to evaluations 1 to 6 described above.
Table 2 presents the evaluation results.

TABLE 1

| | | Electrophotographic belt No. | Second layer and third layer | | | | | | | | |
|---|---|---|---|---|---|---|---|---|---|---|---|
| | | | Acrylic resin | | | | Second polyester resin | | | Electro-conductive particle | | Content ratio of [carboxy group/hydroxy group] | Covered surface of base layer |
| | | | Type | Functional group | Acid value mgKOH/g | Content (% by mass) | Type | Hydroxyl group mgKOH/g | Content (% by mass) | Type | Content (% by mass) | | |
| Example | 1 | 1 | acrylic resin (1) | carboxy group | 74 | 8.1 | polyester (1) | 6 | 81.3 | carbon | 10.6 | 1.2 | inner peripheral surface |
| | 2 | 2 | acrylic resin (1) | carboxy group | 74 | 8.1 | polyester (2) | 2 | 81.3 | carbon | 10.6 | 3.7 | inner peripheral surface |
| | 3 | 3 | acrylic resin (1) | carboxy group | 74 | 14.9 | polyester (2) | 2 | 74.5 | carbon | 10.6 | 7.4 | inner peripheral surface |
| | 4 | 4 | acrylic resin (1) | carboxy group | 74 | 20.6 | polyester (2) | 2 | 68.8 | carbon | 10.6 | 11.1 | inner peripheral surface |
| | 5 | 5 | acrylic resin (1) | carboxy group | 74 | 8.1 | polyester (3) | 4 | 81.3 | carbon | 10.6 | 1.8 | inner peripheral surface |

TABLE 1-continued

Second layer and third layer

| | Electrophotographic belt No. | Acrylic resin | | | | Second polyester resin | | | Electroconductive particle | | Content ratio of [carboxy group/ hydroxy group] | Covered surface of base layer |
|---|---|---|---|---|---|---|---|---|---|---|---|---|
| | | Type | Functional group | Acid value mgKOH/g | Content (% by mass) | Type | Hydroxyl group mgKOH/g | Content (% by mass) | Type | Content (% by mass) | | |
| 6 | 6 | acrylic resin (1) | carboxy group | 74 | 8.1 | polyester (4) | 6 | 81.3 | carbon | 10.6 | 1.2 | inner peripheral surface |
| 7 | 7 | acrylic resin (1) | carboxy group | 74 | 8.1 | polyester (1) | 6 | 81.3 | carbon | 10.6 | 1.2 | inner peripheral surface and outer peripheral surface (grooved) |
| 8 | 8 | acrylic resin (1) | carboxy group | 74 | 9.1 | polyester (1) | 6 | 90.9 | — | — | 1.2 | outer peripheral surface (grooved) |
| | | acrylic resin (1) | carboxy group | 74 | 8.1 | polyester (1) | 6 | 81.3 | carbon | 10.6 | 1.2 | inner peripheral surface |
| Comparative example 1 | 9 | — | — | — | — | polyester (1) | 6 | 89.4 | carbon | 10.6 | — | inner peripheral surface |
| 2 | 10 | acrylic resin (2) | functional group-free | 0 | 8.1 | polyester (1) | 6 | 81.3 | carbon | 10.6 | 0.0 | inner peripheral surface |
| 3 | 11 | acrylic resin (3) | Hydroxy group | 0 | 8.1 | polyester (1) | 6 | 81.3 | carbon | 10.6 | 0.0 | inner peripheral surface |
| 4 | 12 | acrylic resin (1) | carboxy group | 74 | 89.4 | — | — | — | carbon | 10.6 | — | inner peripheral surface |
| 5 | 13 | acrylic resin (2) | functional group-free | 74 | 89.4 | — | — | — | carbon | 10.6 | — | inner peripheral surface |

TABLE 2

| | | Evaluation 1 Hardness | Evaluation 2 | | Evaluation 3 | Evaluation 4 | Evaluation 6 | |
|---|---|---|---|---|---|---|---|---|
| | | | Surface resistivity | Volume resistivity | | | Image quality evaluation rank | |
| | | (GPa) | (Ω/□) | (Ω · cm) | rank | rank | Initial | 150k sheets |
| Example | 1 | 0.19 | 1.9E+05 | 4.0E+09 | B | A | A | A |
| | 2 | 0.21 | 2.6E+05 | 4.8E+09 | A | A | A | A |
| | 3 | 0.23 | 2.8E+05 | 5.1E+09 | A | A | A | A |
| | 4 | 0.25 | 2.9E+05 | 5.3E+09 | A | B | A | A |
| | 5 | 0.20 | 2.4E+05 | 5.0E+09 | A | A | A | A |
| | 6 | 0.22 | 3.1E+05 | 5.5E+09 | A | A | A | A |
| | 7 | 0.19 | 1.9E+05 | 4.3E+09 | B | A | A | A |
| | 8 | 0.21 | 6.0E+11 | 2.0E+10 | A | A | A | A |
| | | 0.19 | 1.9E+05 | | B | A | A | A |
| Comparative example | 1 | 0.13 | 2.7E+05 | 3.8E+09 | C | A | A | C |
| | 2 | 0.14 | 3.1E+05 | 4.0E+09 | C | A | A | C |
| | 3 | 0.14 | 1.7E+05 | 3.5E+09 | C | A | A | C |
| | 4 | 0.17 | 4.2E+05 | 6.1E+09 | B | C | A | C |
| | 5 | 0.16 | 4.5E+05 | 5.9E+09 | B | C | A | C |

The evaluation results presented in Table 2 are described below.

Electrophotographic belts Nos. 1 to 8 according to Examples 1 to 8, in which each of the second layers contained the carboxy group-containing acrylic resin and the polyester resin, were good in both scratch resistance and interlayer adhesion, and the quality of the output image of the 150,000th sheet was also good.

The presence of a carboxy group in the molecules of the acrylic resin in the second layer is less likely to deteriorate the scratch resistance of the second layer even if the polyester resin is present in the second layer. The reason for this is presumably that interactions, such as hydrogen bonding, occur between the terminal hydroxy group of the polyester resin and the carboxy group of the acrylic resin, and a pseudo-crosslinked structure is formed between the acrylic resin and the polyester resin.

Electrophotographic belts Nos. 2, 5, and 6, in which the urethane group-containing polyester resins (polyesters (2) to (4)) were contained, had high hardness and particularly good scratch resistance, compared with electrophotographic belt No. 1.

In electrophotographic belt No. 9 according to Comparative example 1, in which the second layer contained the polyester resin having no carboxy group-containing acrylic resin, the adhesion was good, but the scratch resistance was not at a sufficient level. In the output image of the 150,000th sheet, image defects caused by scratches on the inner peripheral surface of the electrophotographic belt were observed. Electrophotographic belts Nos. 12 and 13, in which no polyester resin was contained in each of the second layers, the adhesion to the base layer was not at a sufficient level. In the output image of each of the 150,000th sheets, image defects caused by unevenness due to peeling of the second layer from the base layer on the inner peripheral surface of the electrophotographic belt were observed.

According to at least one aspect of the present disclosure, it is possible to obtain an electrophotographic belt having a layered structure with excellent scratch resistance and excellent adhesion of layers to each other. According to at least one other aspect of the present disclosure, it is possible to obtain an electrophotographic image-forming apparatus capable of stably forming a high-quality electrophotographic image.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

The invention claimed is:

1. An electrophotographic belt, comprising:
a first layer, and a second layer directly covering any one of an inner peripheral surface and an outer peripheral surface of the first layer,
the first layer containing a first polyester resin, and
the second layer containing a second polyester resin and an acrylic resin that contains a carboxy group in a molecule.

2. The electrophotographic belt according to claim 1, wherein the first polyester resin is at least one of a poly(ethylene terephthalate) and a poly(ethylene naphthalate).

3. The electrophotographic belt according to claim 1, wherein the acrylic resin containing the carboxy group in the molecule contains a structural unit represented by formula (1):

structural formula (1)

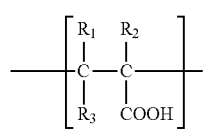

where $R_1$ to $R_3$ in structural formula (1) are each independently hydrogen or a hydrocarbon group having 1 or more and 3 or less carbon atoms.

4. The electrophotographic belt according to claim 1, wherein the acrylic resin containing the carboxy group in the molecule has an acid value of 70 mgKOH/g or more.

5. The electrophotographic belt according to claim 1, wherein the second polyester resin is a polyester-urethane resin.

6. The electrophotographic belt according to claim 1, wherein a content ratio of the carboxy group of the acrylic resin to a hydroxy group of the polyester resin contained in the second layer (carboxy group/hydroxy group) is 1.0 or more and 12.0 or less.

7. The electrophotographic belt according to claim 1, wherein the electrophotographic belt has an endless shape.

8. The electrophotographic belt according to claim 1, wherein the second layer has a thickness of 0.05 µm or more and 10 µm or less.

9. The electrophotographic belt according to claim 1, further comprising a third layer, wherein of the inner peripheral surface and the outer peripheral surface of the first layer, the third layer directly covers the opposite surface of the first layer from the surface covered with the second layer,
wherein the third layer includes a groove on an outer surface.

10. The electrophotographic belt according to claim 9, wherein the groove is provided on the outer surface of the third layer, extends in a circumferential direction of the electrophotographic belt, and is non-parallel to the circumferential direction.

11. The electrophotographic belt according to claim 1, wherein an average hardness of a region in the second layer is 0.10 GPa or more, the region extending from a position 10% of a thickness of the second layer in a thickness direction from an outermost surface to a position 20% of the thickness of the second layer in the thickness direction from the outermost surface, the average hardness being measured by a nano-indentation measurement method with a Berkovich type indenter at an outer surface of the second layer.

12. The electrophotographic belt according to claim 1, wherein the second layer contains an electro-conductive particle, and the second layer has a surface resistivity of $4.0 \times 10^6 \Omega/\square$ or less.

13. The electrophotographic belt according to claim 1, wherein the electrophotographic belt has a volume resistivity of $1 \times 10^9$ Ω·cm or more and $1 \times 10^{11}$ Ω·cm or less.

14. An electrophotographic image-forming apparatus, comprising:
a plurality of toner image-bearing members and an intermediate transfer belt to which a toner image is primarily transferred from each of the toner image-bearing members, wherein the intermediate transfer belt is an electrophotographic belt comprising:
a first layer, and a second layer directly covering any one of an inner peripheral surface and an outer peripheral surface of the first layer,
the first layer containing a first polyester resin, and
the second layer containing a second polyester resin and an acrylic resin that contains a carboxy group in a molecule.

15. The electrophotographic image-forming apparatus according to claim 14, further comprising:
a current supply member in contact with the intermediate transfer belt, and a power supply configured to apply a voltage to the current supply member, wherein the toner image is primarily transferred from each of the toner image-bearing members to the intermediate transfer belt by applying a voltage to the current supply member from the power supply to pass a current through the intermediate transfer belt in a circumferential direction.

16. The electrophotographic image-forming apparatus according to claim 15, wherein the current supply member is in contact with an outer peripheral surface of the electrophotographic belt.

* * * * *